(12) United States Patent
Hsu et al.

(10) Patent No.: US 12,517,348 B2
(45) Date of Patent: Jan. 6, 2026

(54) OPTICAL DETECTION SYSTEM AND METHOD CAPABLE OF AUTOMATICALLY REMOVING FOREIGN SUBSTANCES

(71) Applicant: H.P.B. OPTOELECTRONICS CO., LTD., Taichung (TW)

(72) Inventors: Hsuan-Yueh Hsu, Taichung (TW); Yung-Chih Chen, Taichung (TW)

(73) Assignee: H.P.B.OPTOELECTRONIC CO., LTD., Taichung (TW)

( * ) Notice: Subject to any disclaimer, the term of this patent is extended or adjusted under 35 U.S.C. 154(b) by 823 days.

(21) Appl. No.: 17/690,565

(22) Filed: Mar. 9, 2022

(65) Prior Publication Data

US 2022/0291503 A1   Sep. 15, 2022

Related U.S. Application Data

(60) Provisional application No. 63/216,003, filed on Jun. 29, 2021, provisional application No. 63/160,094, filed on Mar. 12, 2021.

(51) Int. Cl.
*G02B 27/00* (2006.01)
*B06B 1/06* (2006.01)
(Continued)

(52) U.S. Cl.
CPC ............ *G02B 27/0006* (2013.01); *B06B 1/06* (2013.01); *B08B 7/02* (2013.01); *H02N 2/001* (2013.01);
(Continued)

(58) Field of Classification Search
CPC ....... B06B 1/06; B06B 1/0269; B06B 1/0644; B06B 3/02; B08B 7/02; B08B 3/02;
(Continued)

(56) References Cited

U.S. PATENT DOCUMENTS 11,002,954 B2   5/2021   Kuratani et al.
2004/0012714 A1*  1/2004  Kawai .................... H04N 23/52
348/351
(Continued)

*Primary Examiner* — Amy R Hsu
(74) *Attorney, Agent, or Firm* — MUNCY, GEISSLER, OLDS & LOWE, P.C.

(57) ABSTRACT

The present invention provides an optical detection system and a method capable of automatically removing foreign substances. The optical detection system comprises an optical sensing device including a housing, a transparent cover, an optical sensor, a lens module, a sealing material having flexibility and stiffness, and a piezoelectric component. The sealing material with an annular flake shape is provided between the transparent cover and the piezoelectric component, and extended and fixed to the housing to seal the internal space defined by the housing and the transparent cover. The piezoelectric component performs vibration, which is transmitted to the transparent cover through the sealing material to remove foreign substances from the transparent cover. Thereby, an excellent removing ability for foreign substances can be achieved by effective vibration transmission, and effects of reducing load and power consumption, prolonging service life, and preventing leakage of moisture or water can also be achieved.

20 Claims, 13 Drawing Sheets

(51) Int. Cl.
    *B08B 7/02*    (2006.01)
    *H02N 2/00*    (2006.01)
    *H04N 23/51*    (2023.01)
    *H04N 23/52*    (2023.01)
    *H04N 23/81*    (2023.01)
(52) U.S. Cl.
    CPC .......... *H02N 2/0055* (2013.01); *H04N 23/51* (2023.01); *H04N 23/52* (2023.01); *H04N 23/811* (2023.01)
(58) Field of Classification Search
    CPC .. B08B 7/0064; G02B 27/0006; G02B 7/026; H04N 23/52; H04N 23/51; H04N 23/811; G03B 17/08; G03B 17/55; G03B 17/56; H02N 2/001; H02N 2/0055
    See application file for complete search history.

(56) References Cited

U.S. PATENT DOCUMENTS

| | | | |
|---|---|---|---|
| 2012/0200922 A1* | 8/2012 | Urakami | B08B 7/02 |
| | | | 15/94 |
| 2012/0243093 A1* | 9/2012 | Tonar | H10N 30/20 |
| | | | 359/507 |
| 2014/0218588 A1* | 8/2014 | Ifuku | H04N 23/811 |
| | | | 348/340 |
| 2019/0162953 A1* | 5/2019 | Bretagnol | G02B 27/0006 |
| 2020/0358938 A1* | 11/2020 | Hsu | G03B 17/08 |
| 2020/0368793 A1* | 11/2020 | Deniau | G02B 27/0006 |

\* cited by examiner

OPTICAL DETECTION SYSTEM AND METHOD CAPABLE OF AUTOMATICALLY REMOVING FOREIGN SUBSTANCES

CROSS-REFERENCE TO RELATED APPLICATION

This application claims benefit of U.S. provisional patent application No. 63/160,094, filed Mar. 12, 2021 and U.S. provisional patent application No. 63/216,003, filed on Jun. 29, 2021. The entire contents of which are incorporated herein by reference.

BACKGROUND OF THE INVENTION

1. Field of the Invention

The present invention relates to an optical detection system and a method capable of automatically removing foreign substances. More particularly, the present invention relates to an optical detection system capable of automatically removing foreign substances by utilizing a material having flexibility and stiffness to seal the optical sensing device and transmit the vibration generated by the piezoelectric component, and a method for removing foreign substances on the optical detection system using said system.

2. The Prior Arts

Optical detection systems such as camera systems have been widely used in environment as surveillance cameras, electric car mirrors, and the like. However, when optical detection systems are used outdoors, they are more likely to be affected by foreign substances. For example, raindrops, snow, frost, muddy water, etc. may block the incident light. Therefore, the images detected by the optical detection systems are aggravated.

U.S. Pat. No. 11,002,954 B2 discloses an image capturing apparatus including a cleaning device, wherein the surface of the translucent body can be cleaned by vibrating the translucent body with a vibrator. However, the vibrator must have a cylindrical structure (e.g., first and second cylindrical members) to provide a space for vibration. Such vibration device makes the structure of the optical sensing device (i.e., camera) larger and more complicated.

As the inventor's previous research, US Patent Publication No. US 20200358938 A1 discloses a method for removing foreign substances from a camera system, wherein a piezoelectric component is provided on a transparent cover of a camera device, and the piezoelectric component performs vibration to remove the foreign substances from the transparent cover, and a soft sealing material is used to surround the transparent cover to seal the optical sensing device.

In this existing ICVS (Instant Clear View System) structure, the soft sealing material (e.g., O-ring) is used as the interface between the vibration source (i.e., the piezoelectric component) and the surroundings, however, such a design has a contradiction between the waterproof level and the vibration ability. Specifically, if it is intended to improve the waterproof level, a higher amount of pressing for O-ring is required, which limits the vibration ability of the vibration source to the surroundings, thereby reducing the performance of removing foreign substances. On the contrary, if the amount of pressing for O-ring is reduced for increasing the vibration ability, moisture or even water will enter (leak) into the confined space of the optical sensing device.

In addition, the O-ring will age, that is, harden and lose elasticity, after being used for a period of time, which also limits the vibration ability of the vibration source to the surroundings, thereby reducing the performance of removing foreign substances. Referring to FIGS. 1A to 1C, which respectively illustrate impedance-vibration frequency curves of piezoelectric components of existing optical detection systems, wherein the optical detection systems are respectively an optical detection system without the use of O-ring, an optical detection system in which the used O-ring has not aged, and an optical detection system in which the used O-ring has aged, and wherein vibrations of a sequence of frequencies are applied to the piezoelectric components, and the impedances of the piezoelectric components are measured by an impedance analyzer. In these curves, $R_{max}$ is the maximum impedance value corresponding to the resonance point, and $R_{min}$ is the minimum impedance value corresponding to the anti-resonance point.

For piezoelectric materials, when $R_{max}$ is larger, $R_{min}$ is smaller, and the vibration amplitude is larger. In FIGS. 1A to 1C, $R_{min}$ of the optical detection system without the use of O-ring, the optical detection system in which the used O-ring has not aged, and the optical detection system in which the used O-ring has aged are 0.605 kΩ, 1.38 kΩ, and 1.93 kΩ, respectively. In the case without the use of O-ring, there is no pressing effect of O-ring, such that $R_{min}$ is smallest and the vibration amplitude is largest, but leakage of moisture or even water will be occurred due to the lack of pressing. In the case that the O-ring used has been aged, $R_{min}$ is largest and the vibration amplitude is smallest, this is because that the hardened O-ring limits the vibration ability of the piezoelectric component to the surroundings.

Therefore, in the case that the elastic sealing material such as O-ring is used in the existing ICVS structure as the interface between the vibration source and the surroundings, since the O-ring will age as the number of vibrations increases, the vibration level will be limited, thereby resulting the instability in performance of removing foreign substances.

SUMMARY OF THE INVENTION

Therefore, the present invention intends to develop an optical detection system capable of automatically removing foreign substances in a stable and effective way, which has a simple vibration structure and utilizes a material different from the prior art to seal the optical sensing device and transmit the vibration generated by the piezoelectric component, and a method for removing foreign substances on the optical detection system using said system.

In one aspect of the present invention, an optical detection system capable of automatically removing foreign substances is provided. The optical detection system comprises an optical sensing device including:
  a housing having an opening on one side thereof;
  a transparent cover disposed at the opening, the housing and the transparent cover jointly define an internal space of the optical sensing device;
  an optical sensor provided in the internal space of the optical sensing device;
  a lens module provided between the transparent cover and the optical sensor;
  a piezoelectric component, wherein in the internal space of the optical sensing device, the piezoelectric component is provided at an edge of the transparent cover; and a sealing material having flexibility and stiffness, which has an annular flake shape, is provided between the edge of the transparent cover and an edge of the piezoelectric component, and extended and fixed to the housing to seal the internal space of the optical sensing device; wherein the piezoelectric component performs vibration, and the vibration is transmitted to the transparent cover through the sealing material to remove foreign substances from the transparent cover.

In a preferred embodiment, the optical sensing device further includes a soft shielding material, which has an annular flake shape and is disposed on an outer side of the housing and the transparent cover to shield a gap among the housing, the transparent cover and the sealing material.

In another embodiment, the lens module is arranged at the opening, and the lens module includes:

a top lens, which is the transparent cover of the optical sensing device, and is disposed at an outermost side of the lens module with respect to the internal space of the optical sensing device;

a lateral casing, wherein the housing of the optical sensing device further includes the lateral casing, and the top lens and the housing of the optical sensing device including the lateral casing jointly define the internal space of the optical sensing device;

a bottom lens disposed on an opposite side of the top lens, and the top lens, the lateral casing and the bottom lens jointly define an interior space of the lens module; and one or more interior lens(es), wherein in the interior space of the lens module, the interior lens(es) is(are) disposed between the top lens and the bottom lens; wherein in the interior space of the lens module, the piezoelectric component is provided at an edge of the top lens;

the sealing material is provided between the edge of the top lens and the edge of the piezoelectric component, and extended and fixed to the lateral casing to seal the internal space of the optical sensing device; and wherein the piezoelectric component performs the vibration, and the vibration is transmitted to the top lens through the sealing material to remove foreign substances from the top lens.

Preferably, the sealing material includes one or more selected from a group consisting of aluminum, steel, titanium alloy, magnesium aluminum alloy, polyimide, polycarbonate, and polyethylene terephthalate.

Preferably, the sealing material has a thickness of 10 to 200 μm.

Preferably, the soft shielding material has a thickness of 10 to 500 μm.

Preferably, the soft shielding material includes one or more selected from a group consisting of polyurethane (such as thermoplastic polyurethane), ethylene propylene diene monomer, silicone and polyimide.

In a preferred embodiment, the optical detection system further comprises:

a frequency control unit electrically connected to the optical sensing device; wherein the frequency control unit controls a frequency and a vibration time for driving the vibration of the piezoelectric component such that the piezoelectric component vibrates with at least one vibration frequency based on one or more resonant frequencies of the piezoelectric component and the vibration time to remove foreign substances from the transparent cover.

In a preferred embodiment, the optical detection system further comprises:

one or more detecting unit(s);

a micro control unit electrically connected to the frequency control unit and the detecting unit(s); and a driving unit electrically connected to the frequency control unit and the piezoelectric component; wherein the detecting unit(s) detect(s) a state of the optical sensing device, and sends a state signal related to the state of the optical sensing device to the micro control unit, the micro control unit receives the state signal from the detecting unit(s), and controls the frequency control unit to send a command for driving the vibration of the piezoelectric component to the driving unit based on the state signal, and the driving unit drives the vibration of the piezoelectric component in response to the command from the frequency control unit.

Wherein, the state of the optical sensing device may include a least one of an image on the transparent cover, an impedance-vibration frequency curve of piezoelectric components, and a temperature of the transparent cover.

In this preferred embodiment, the optical detection system can further comprises an AI image recognition device electrically connected to the optical sensor and the micro control unit; wherein the optical sensor provides a sensed image thereof to the AI image recognition device, the AI image recognition device identifies a type of the foreign substances on the transparent cover based on the image, and sends a type signal related to the type of the foreign substances to the micro control unit, and the micro control unit receives the type signal from the AI image recognition device, and controls the frequency control unit to send the command for driving the vibration of the piezoelectric component to the driving unit based on the type signal.

In another aspect of the present invention, a method for automatically removing foreign substances on the optical detection system using the optical detection system as described above is provided. The method comprises a removing step removing the foreign substances from a transparent cover of an optical sensing device by a vibration of a piezoelectric component transmitting through a sealing material having flexibility and stiffness to the transparent cover.

In a preferred embodiment, the method further comprises the following steps before the removing step:

an identifying step identifying a type of the foreign substances on the transparent cover based on at least one of a temperature of the transparent cover, an image detected by the optical detection system, and an impedance-vibration frequency curve of the piezoelectric component; and a frequency acquiring step applying vibrations of a sequence of frequencies to the piezoelectric component and acquiring one or more resonant frequencies of the piezoelectric component; and wherein the removing step further includes: determining at least one vibration frequency of the piezoelectric component based on the one or more resonant frequencies and a vibration time according to the identified type of the foreign substances, and driving the vibration of the piezoelectric component with the vibration frequency and the vibration time, thereby removing at least a portion of the foreign substances from the transparent cover by the vibration of the piezoelectric component.

Preferably, in the removing step, the vibration of the piezoelectric component is driven by pulse driving or continuous driving.

Preferably, in the removing step, the vibration frequency for driving the vibration of the piezoelectric component is in a range of 20 kHz to 1.4 MHz.

Preferably, in the identifying step, the type of the foreign substances on the transparent cover is identified by analyzing the detected image of the optical detection system with an AI image recognition method. Wherein the AI image recognition method may be an analyzing algorithm using machine learning, deep learning, or neural network.

Preferably, in the identifying step, the foreign substances being fog, water, snow, frost, ice, or muddy water are identified based on at least one of a temperature of the transparent cover, an image detected by the optical detection system, and an impedance-vibration frequency curve of the piezoelectric component.

Preferably, in the removing step, the vibration of the piezoelectric component leads to at least one of shifting, bounce, temperature rising, atomization, melting, and sublimation of the foreign substances on the transparent cover.

In a preferred embodiment, the removing step further includes at least one of the following steps:

heating the transparent cover; and washing the transparent cover using a water jet.

The optical detection system and method capable of automatically removing foreign substances according to the present invention can have an excellent removing ability for foreign substances due to the effective transmission of vibration, and can also achieve the effects of reducing load and power consumption, prolonging service life and preventing leakage of moisture or water.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 2:
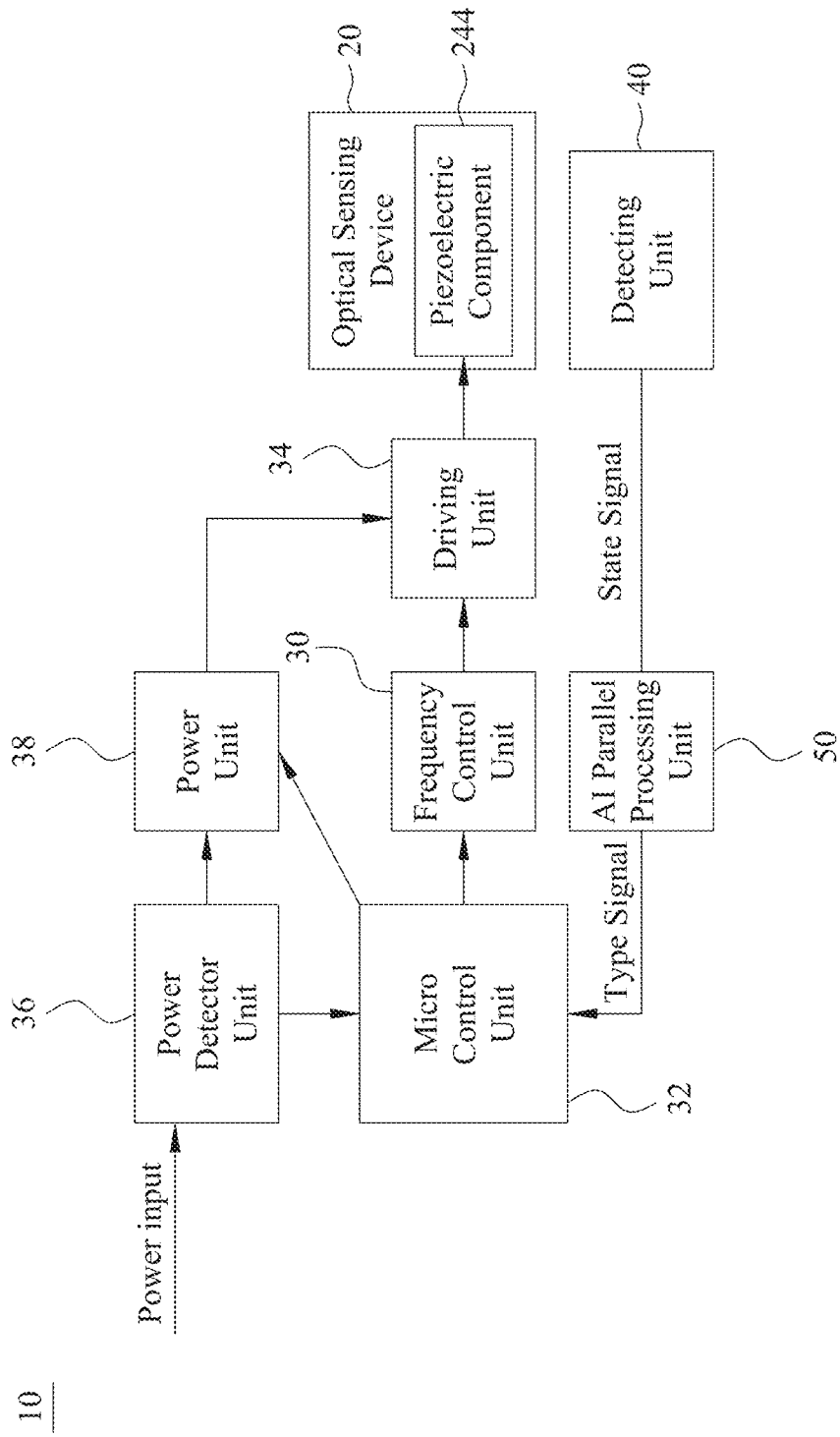
FIG. 2 illustrates an exemplary optical detection system according to the present invention.

Hereinafter, structural details of the optical detection system according to the present invention will be illustrated with reference to the drawings, wherein FIG. 2 illustrates an exemplary optical detection system 10 according to the present invention, and FIGS. 3 to 5A illustrates structural details of optical sensing devices 20 according to respective embodiments of the present invention. Since the following description is focused on the structural features, some units described below with reference to FIG. 2 may not be further described or illustrated in FIGS. 3 to 5A. However, it can be understood that such units may be incorporated in the optical sensing devices (20 in FIGS. 3 to 5A) or arranged outside of the optical sensing devices (20 in FIGS. 3 to 5A), without particular limits. It can be understood that spatial orientations and relative positions of components will be changed as the rotation of the optical detection system 10.

Figure 3:
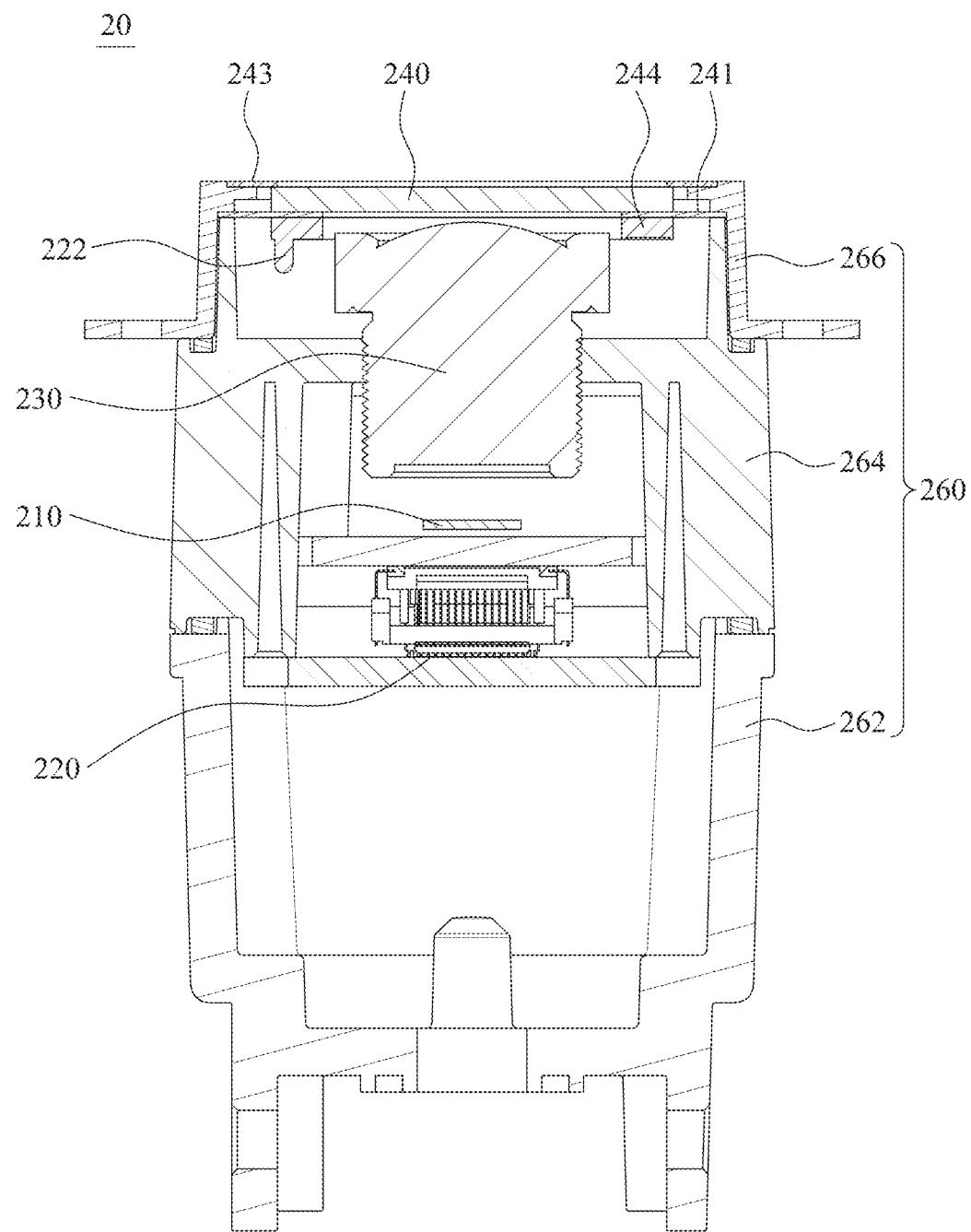
FIG. 3 illustrates an optical sensing device according to an embodiment of the present invention.
Figure 4:
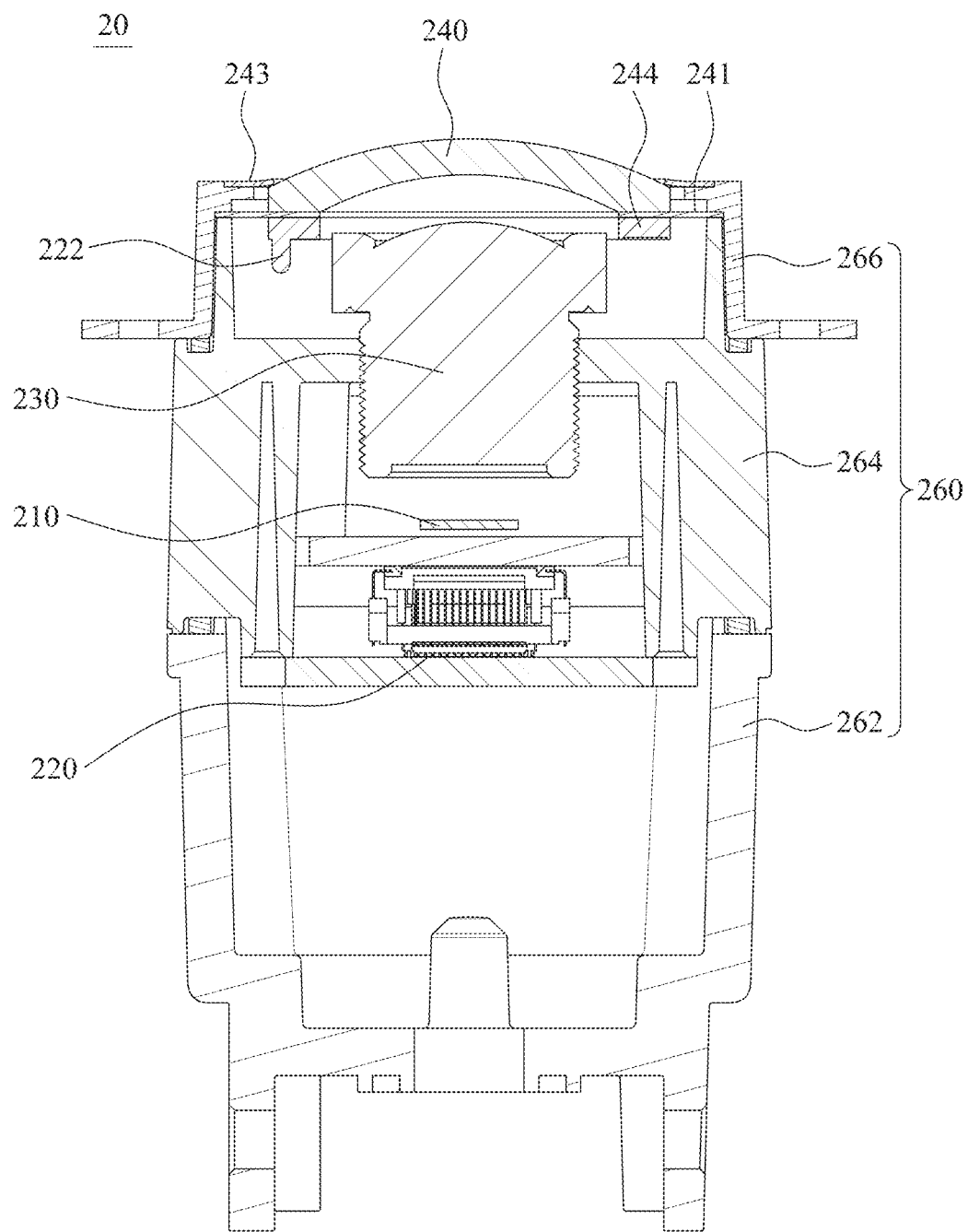
FIG. 4 illustrates an optical sensing device according to another embodiment of the present invention.

Referring to FIG. 2, in one aspect of the present invention, an optical detection system 10 capable of automatically removing foreign substances is provided. The optical detection system 10 comprises an optical sensing device 20. In the embodiment of the present invention, the optical detection system 10 may be a camera system, and the optical sensing device 20 may be a camera device. For ease of understanding, FIG. 2 shows the communication and electrical connection of related units. Referring to FIGS. 3 and 4, the optical sensing device 20 includes a housing 260, a transparent cover 240, an optical sensor 210, a lens module 230, a sealing material 241 having flexibility and stiffness, and a piezoelectric component 244. FIG. 3 shows an embodiment in which the transparent cover 240 has shape with planar surfaces (e.g., a plane lens), and FIG. 4 shows an embodiment in which the transparent cover 240 has a shape with curved surfaces (e.g., a convex lens or a concave lens).

The housing 260 has an opening on one side (e.g., upper sides in FIGS. 3 and 4) thereof. The transparent cover 260 is disposed at the opening. The housing 230 and the transparent cover 240 jointly define an internal space of the optical sensing device 20. The optical sensor 210 is provided in the internal space of the optical sensing device 20. The lens module 230 is provided between the transparent cover 240 and the optical sensor 210. The sealing material 241 has an annular flake shape.

In the internal space of the optical sensing device 20, the piezoelectric component 244 is provided at the edge of the transparent cover 240. The piezoelectric component 244 comprises a piezoelectric material, such as PZT or the like. The piezoelectric component 244 may be electrically connected to a circuit board 220 by a cable 222. The sealing material 241, which has an annular flake shape, is provided (attached) between the edge of the transparent cover 240 and the edge of the piezoelectric component 244, and extended and fixed to the housing 260 to seal the internal space of the optical detecting device 20. The piezoelectric component 244 performs vibration, and the vibration is transmitted to the transparent cover 240 through the sealing material 241 to remove foreign substances from the transparent cover 240.

Figure 6A:
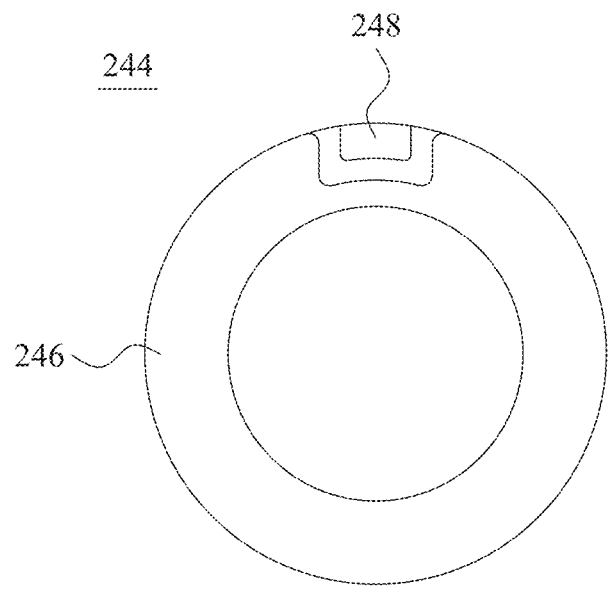
FIGS. 6A and 6B illustrate exemplary piezoelectric components according to the present invention, respectively.
Figure 6B:
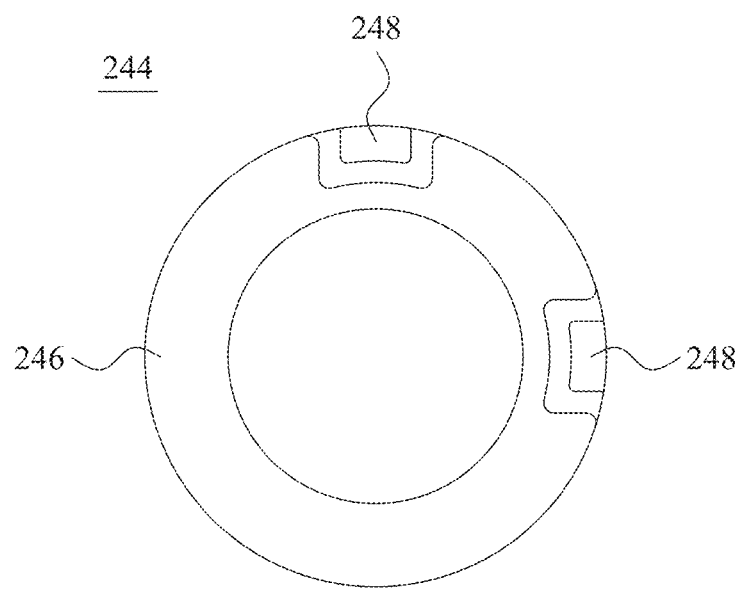

Preferably, as shown in FIGS. 6A and 6B, the piezoelectric component 244 may have an annular shape, and is arranged at the edge on the inner side of the transparent cover 240, such that the foreign substances can be removed in a more efficiency and component-saving manner. The piezoelectric component 244 may be attached to the transparent cover 240. The piezoelectric component 244 may be disposed around a periphery of the lens module 230.

The sealing material 241 has flexibility and stiffness, and includes preferably one or more selected from a group consisting of aluminum, steel (e.g., SUS304), titanium alloy, magnesium aluminum alloy, polyimide (PI), polycarbonate (PC), and polyethylene terephthalate (PET). The sealing material 241 may be a metal foil of metal such as aluminum, steel, titanium alloy, or magnesium-aluminum alloy, or may be a flake or membrane made of polyimide, polycarbonate, or polyethylene terephthalate. Preferably, the sealing material 241 has a thickness of 10 to 200 μm. The sealing material 241 is waterproof, and thus can seal the internal space of the optical sensing device 20.

Regarding the support strength of the sealing material as the interface between the vibration source and the surroundings according to the present invention, a polyimide material with a thickness of 12.5 μm is taken as an example, which has a tensile strength of 28 kgf/mm$^2$ and an elongation of 67%. The total weight of the transparent cover and the piezoelectric component is only about 3 g, so that the polyimide material with a thickness of 12.5 μm has enough strength to bear the weight of the transparent cover and the piezoelectric component. Moreover, the swing amplitude caused by the vibration will not be greater than the above-mentioned elongation. Therefore, as the interface between the vibration source and the surroundings, the sealing material has sufficient support strength, and there is no breaking risk of the sealing material.

The advantage of using a sealing material according to the present invention as the interface between the vibration source and the surroundings is that, compared with the soft sealing material in the prior art, the sealing material having flexibility and stiffness can effectively transmit the vibration generated by the piezoelectric component to the transparent cover, and reduce the vibration transmitted to the other surroundings (other than the transparent cover). Due to such vibration transmission, the load can be minimized, that is, the power consumption of the optical sensing device is lowered, and the good stability of the sealing material can also be maintained under long-term operation without aging (hardening). In addition, such sealing materials are also waterproof and can prevent moisture or water from leaking into the optical sensing device.

Further, compared with the soft sealing materials in the prior art, the sealing material such as steel, aluminum, and magnesium aluminum alloy, which have good thermal conductivity, can also effectively conduct the heat generated by the vibration source (piezoelectric component) under continuous operation to the housing/casing next thereto (for example, the housing 266 in FIG. 3 or FIG. 4, or the housing 264 in FIG. 5A, each of which is, for example, a metal support frame or a plastic support frame, preferably a metal support frame), thereby improving the problem of the original design structure in which the heat generated under continuous operation cannot be dissipated, and reducing resonance frequency shift due to the temperature rising caused by the operation of the piezoelectric component.

Alternatively, compared with the soft sealing materials in the prior art, the sealing material such as titanium alloy, polyimide, and polyethylene terephthalate, which have good thermal insulation performance as being bad thermal conductors, can effectively gather the heat generated by the vibration source (piezoelectric component) under continuous operation to the transparent cover 240, thereby helps to remove foreign substances such as ice, snow, frost, fog, etc. Suitable sealing materials can be selected according to the types and characteristics of the foreign substances in the environment where the optical detection system 10 is actually used.

On the other hand, in the present invention, since the sealing material having flexibility and stiffness is used instead of the soft sealing material of the prior art as the sealing material between the transparent cover 240 and the housing 260, there may be a gap among the housing 260, the transparent cover 240 and the sealing material 241. Therefore, the sealing material 241 may be exposed outside through such gap, thereby water or other substances may adhere to the sealing material 241.

Since the sealing material 241 is a key supporting member for controlling the optical detection system 10 to achieve an optimal resonance structure, if there are substances adhesion, excessive water adhesion, or even water accumulation on the sealing material 241, the vibration ability will be reduced, or even it will be not able to remove water by vibration.

Figure 7A:
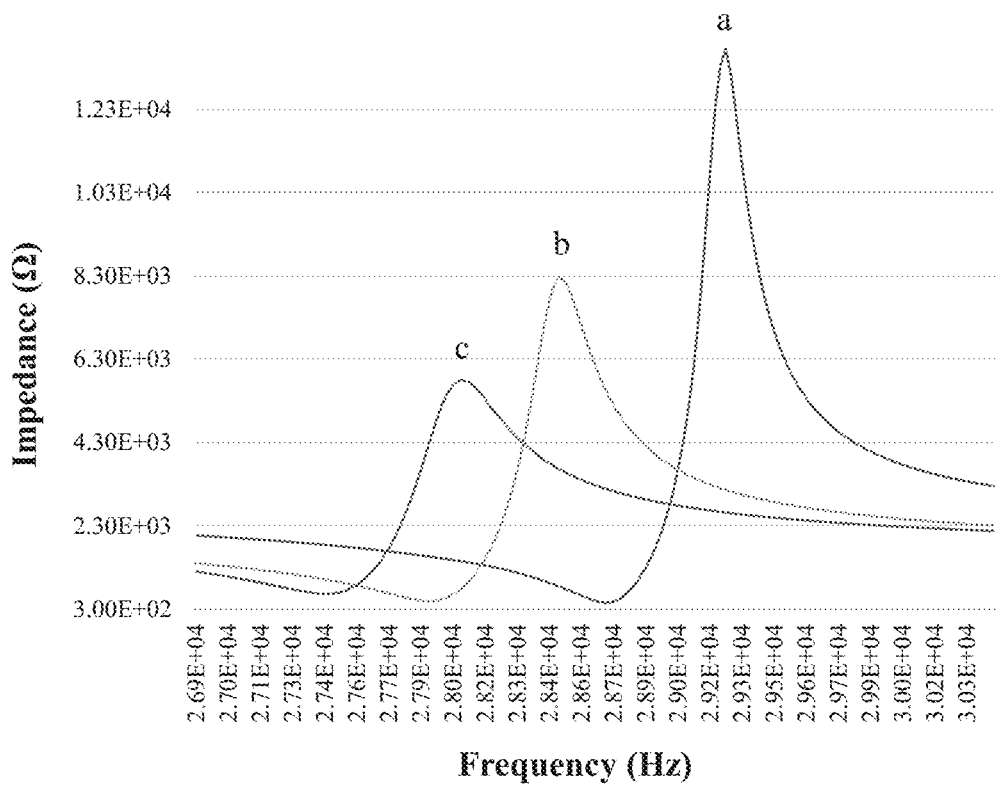
FIG. 7A illustrates impedance-vibration frequency curves of the piezoelectric component of the optical detection system according to the present invention under different water-accumulation levels.

FIG. 7A illustrates impedance-vibration frequency curves of the piezoelectric component of the optical detection system 10 according to the present invention under different water-accumulation levels, wherein the planer transparent cover 240 as shown in FIG. 3 is used, and wherein vibrations of a sequence of frequencies are applied to the piezoelectric components 244, and the impedances of the piezoelectric components 244 are measured by an impedance analyzer, thereby obtaining the impedance-vibration frequency curves of FIG. 7A. In FIG. 7A, curves a, b, and c represent the cases where there is no water-accumulation, a small amount of water-accumulation, and a large amount of water-accumulation in the gap among the housing 260, the transparent cover 240 and the sealing material 241, respectively. In FIG. 7A, the best vibration effect occurs when the impedance value of the piezoelectric component is between 28.6 and 28.8 kHz.

Figure 7B:
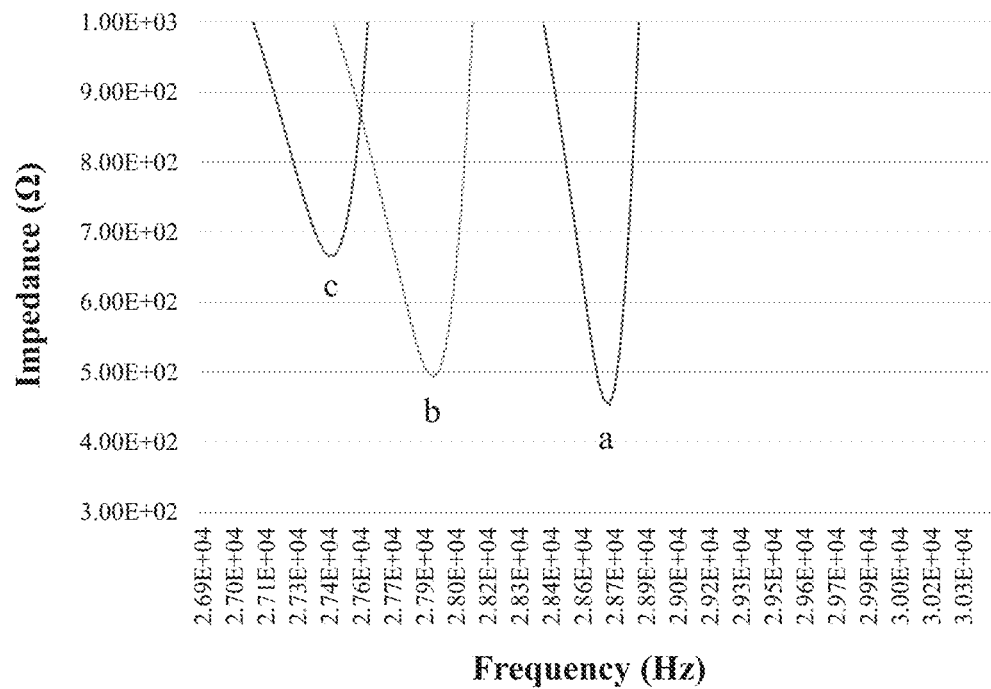
FIG. 7B illustrates a portion of the impedance-vibration frequency curves of FIG. 7A.

FIG. 7B shows a portion of the impedance-vibration frequency curves of FIG. 7A, in which the segments including $R_{min}$ (the impedance values corresponding to the lowest points of the curves) are captured, respectively. As described above, for piezoelectric materials, when $R_{max}$ is larger, $R_{min}$ is smaller, and the vibration amplitude is larger. It can be seen from FIG. 7B that the $R_{min}$ of the curve a (no water-accumulation) is the smallest, which corresponds to the largest vibration amplitude; while the $R_{min}$ of the curve c (a large amount of water-accumulation) is the largest, which corresponds to the smallest vibration amplitude. It indicates that the vibration ability will decrease as the amount of water-accumulation increases.

Therefore, in order to prevent water or other substances from adhering to the sealing material 241, after tests for various types of materials are performed, it is found that by using a thin soft material, as a shielding material, attached to the transparent cover 240 and the sealing material 241 to shield such gap, it is possible to prevent water or other substances from directly adhering to the sealing material 241.

Therefore, in a preferred embodiment, the optical sensing device 20 may further include a soft shielding material 243, which has an annular flake shape and is disposed on the outer side of the housing 260 and the transparent cover 240 to shield the gap among the housing 260, the transparent cover 240 and the sealing material 241.

Preferably, the soft shielding material 243 has a thickness of 10 to 500 µm, and more preferably 10 to 300 µm. Preferably, the soft shielding material 243 includes one or more selected from a group consisting of polyurethane (PU), thermoplastic polyurethane (TPU), ethylene propylene diene monomer (EPDM), silicone and polyimide (PI). The soft shielding material 243 may be a soft pad. The soft shielding material 243 may be waterproof, and respectively attaches to the transparent cover 240 and the housing 260 of the optical sensing device 20 from the outer side, thereby shielding the gap among the housing 260, the transparent cover 240 and the sealing material 241.

Any of the above attachments can be done by glue, welding, or any other way, wherein any glue attachment can be done by using an adhesive with good tensile characteristics and a low hygroscopicity.

The piezoelectric component 244, the sealing material 241 and the soft shielding material 243 may be provided in any suitable annular shape, as long as the incident light entering the optical sensor 210 is not shielded.

It is noted that in the prior art (US 20200358938 A1), the purpose of providing the soft sealing material (O-ring) is to space the vibration source from the surrounding structure and achieve the waterproof effect. However, in the present invention, the function of spacing the vibration source and achieving waterproof effect are mainly provided by the sealing material having flexibility and stiffness, while the main function of the soft shielding material is to prevent water or other substances from adhering to the sealing material. Therefore, the soft shielding material of the present invention is different from the soft sealing material of the prior art in terms of both structural design and function.

According to some embodiments, the housing 260 may include a first housing 262, a lens module holder 264, and a second housing 266. A sealing member such as O-ring may be provided between adjacent two of the first housing 262, the lens module holder 264 and the second housing 266 for sealing. In the embodiments shown in FIGS. 3 and 4, the opening of the housing 260 may be provided at the second housing 266 (especially at the upper side).

Figure 5A:
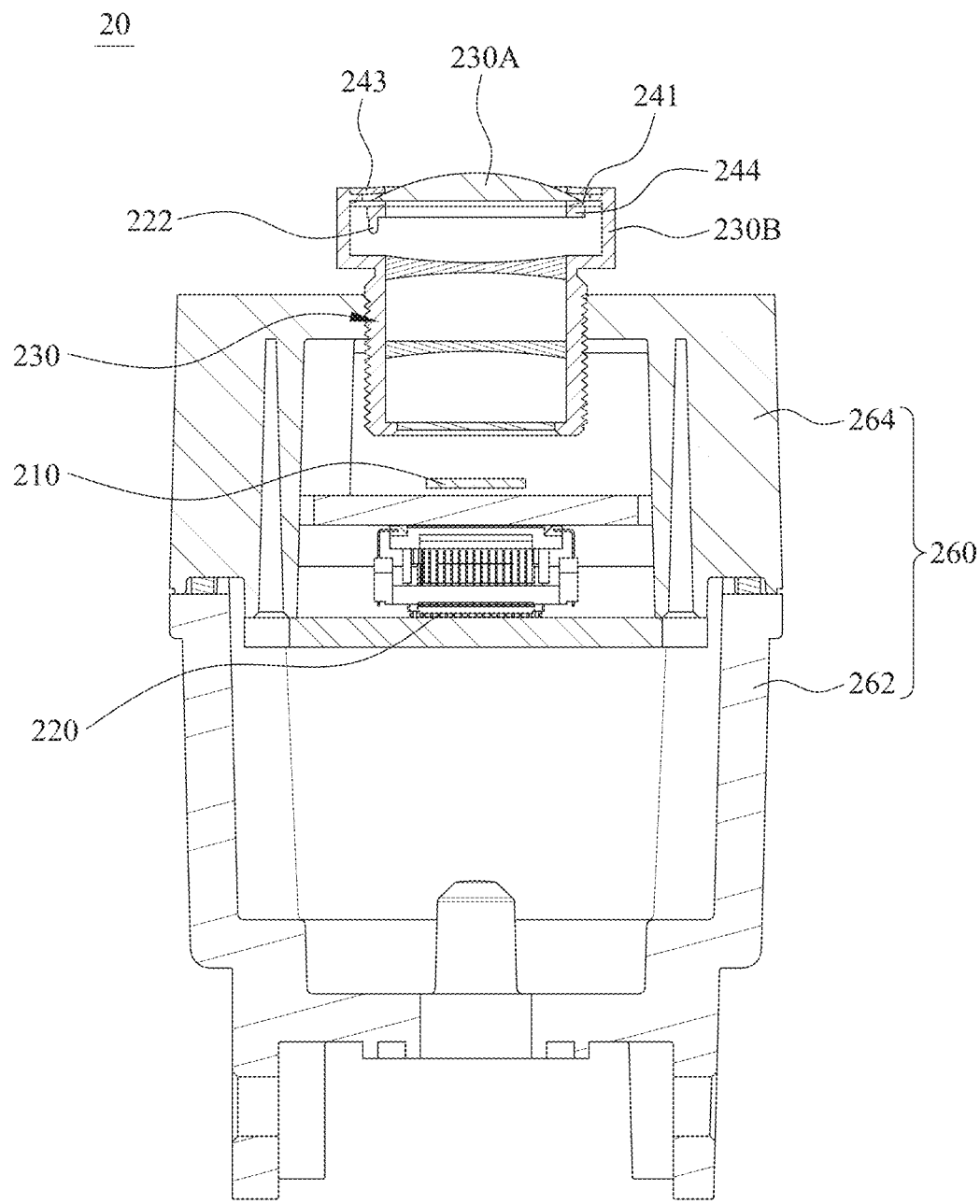
FIG. 5A illustrates an optical sensing device according to yet another embodiment of the present invention.

In various embodiments of the present invention, the lens module 230 may be embedded in the optical sensing device 20 (as shown in FIGS. 3 and 4), or the lens module 230 may at least partially protrude outward from the optical sensing device 20 (as shown in FIG. 5A).

Figure 5B:
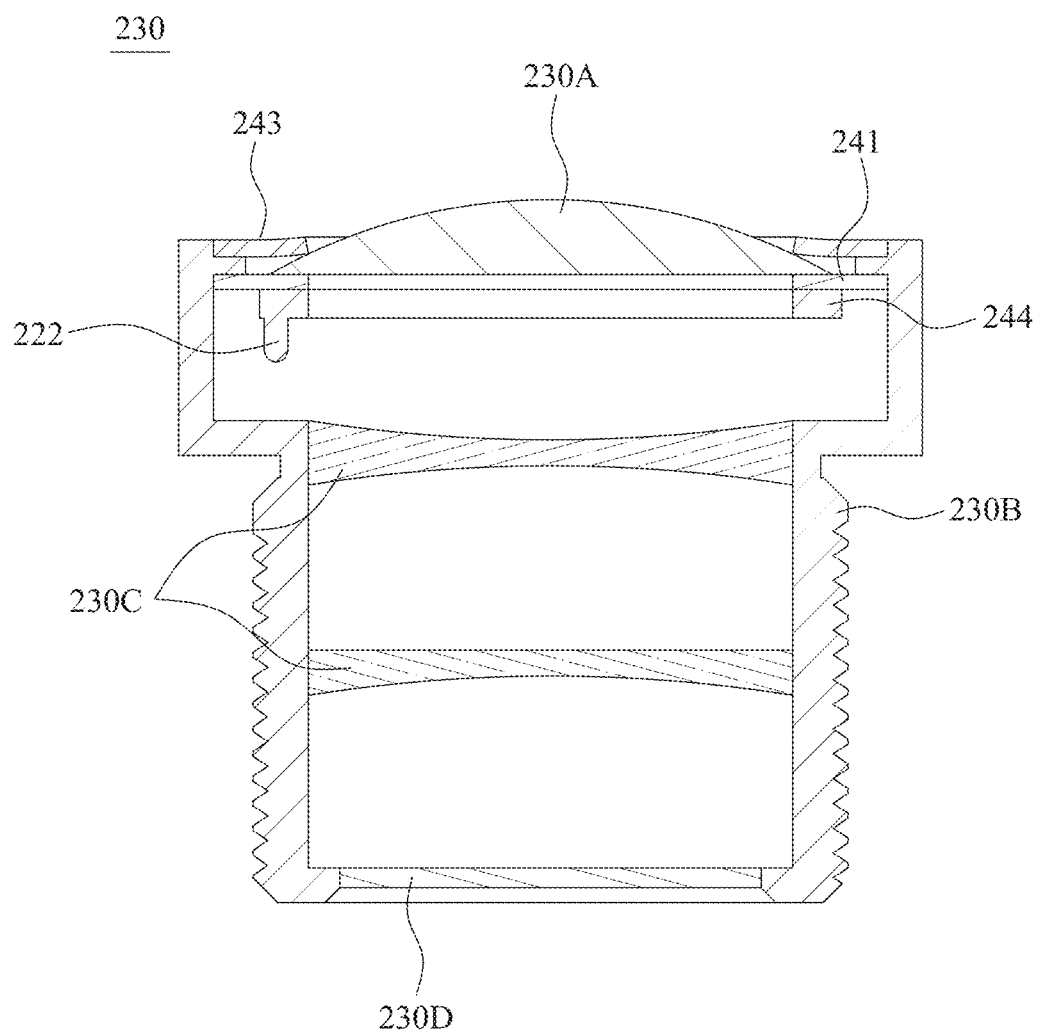
FIG. 5B illustrates the lens module of the optical sensing device of FIG. 5A.

Referring to FIG. 5A, in another embodiment, the lens module 230 is disposed at the opening of the housing 260, in this case, the housing 260 only includes the first housing 262 and the lens module fixing member 264, wherein the opening of housing 260 is provided at the lens module fixing member 264 (especially at the upper side). Referring to FIG. 5B, the lens module 230 may include a top lens 230A, a lateral casing 230B, one or more interior lenses 230C, and a bottom lens 230D. The top lens 230A, the interior lens 230C, and the bottom lens 230D each may have a shape with planar surface or curved surface, i.e., each of them may be a plane lens, a convex lens, or a concave lens.

Referring to FIG. 5B, in this embodiment, the top lens 230A is the transparent cover 240 of the optical sensing device 20, and is disposed at an outermost side of the lens module 230 with respect to the internal space of the optical sensing device 20. The lateral casing 230B may be a cylindrical member. As a part of the housing 260 of the optical sensing device 20, the lateral casing 230B defines the inner space of the optical sensing device 20 together with the top side lens 230A and the housing 260. The bottom lens 230D is disposed on the opposite side of the top lens 230A. The top lens 230A, the lateral casing 230B and the bottom lens 230D jointly define the interior space of the lens module 230. In the interior space of the lens module 230, the one or more interior lens(es) 230C is(are) disposed between the top lens 230A and the bottom lens 230D.

In addition, in this embodiment, in the interior space of the lens module 230, the piezoelectric component 244 is provided at the edge of the top lens 230A. The sealing material 241 is provided (attached) between the edge of the top lens 230A and the edge of the piezoelectric component 244, and extended and fixed to the lateral casing 230B to seal the internal space of the optical sensing device 20. The piezoelectric component 244 performs vibration, and the vibration is transmitted to the top lens 230A through the sealing material 241 to remove foreign substances from the top lens 230A.

As shown in FIG. 2, in a preferred embodiment, the optical detection system 10 may further comprise a frequency control unit 30. The frequency control unit 30 is electrically connected to the optical sensing device, especially connected to the piezoelectric component 244 through a driving unit 34. The frequency control unit 30 controls a frequency and a vibration time for driving the vibration of the piezoelectric component 244 such that the piezoelectric component 244 vibrates with at least one vibration frequency based on one or more resonant frequencies of the piezoelectric component 244 and the vibration time to remove foreign substances from the transparent cover 240 (in the embodiments illustrated in FIGS. 3 and 4), or remove foreign substances from the top lens 230A (in the embodiment illustrated in FIG. 5A).

As shown in FIG. 2, in a preferred embodiment, the optical detection system 10 may further comprise one or more detecting unit(s) 40, a micro control unit 32, and a driving unit 34. The micro control unit 32 is electrically connected to the frequency control unit 30 and the detecting unit(s) 40. The driving unit 34 is electrically connected to the frequency control unit 30 and the piezoelectric component 244.

The detecting unit 40 may be the optical sensor 210 of the optical sensing device 20, as an image detector to detect (sense) the image on the transparent cover 240. The detecting unit 40 can also be an impedance analyzer, as an impedance detecting unit to detect the impedance of the piezoelectric component, thereby an impedance-vibration frequency curve of the piezoelectric component can be obtained. Alternatively, the detecting unit(s) 40 may also be other detecting units, such as a temperature detector or a water drop detector for detecting the temperature of the transparent cover 240 or detecting the presence of water droplets on the transparent cover 240. In the case that the detecting unit 40 is a water drop detector, the detecting unit 40 may be provided with a plurality of sensing points around the optical sensing device 20.

The detecting unit(s) 40 detect(s) a state of the optical sensing device 20, such as the image on the transparent cover 240, the impedance of the piezoelectric component 244 (for mapping the impedance-vibration frequency curve), the temperature of the transparent cover 240, or the presence of water droplets on the transparent cover 240, and sends a state signal related to the state of the optical sensing device 20 to the micro control unit 32.

Then, the micro control unit 32 receives the state signal from the detecting unit(s) 40, and controls the frequency control unit 30 to send a command for driving the vibration of the piezoelectric component 244 to the driving unit 34 based on the state signal. Next, the driving unit 34 drives the vibration of the piezoelectric component 244 in response to the command from the frequency control unit 30.

As shown in FIG. 2, according to some embodiments, the optical detection system 10 may further comprise a power detector unit 36 electrically connected to the micro control unit 32. The power detector unit 36 receives a power input. The optical detection system 10 may further comprise a power unit 38 electrically connected to the micro control unit 32 and the driving unit 34.

In a preferred embodiment, the optical detection system 10 may further comprises an AI parallel processing element 50 electrically connected to the detecting unit 40 and the micro control unit 32. The detecting unit 40 sends the detected state signal to the AI parallel processing element 50. Then, the AI parallel processing element 50 identifies the type of the foreign substances on the transparent cover 240 based on the state signal, and sends a type signal related to the type of the foreign substances to the micro control unit 32. Next, the micro control unit 32 receives the type signal from the AI parallel processing element 50, and controls the frequency control unit 30 to send a command for driving the vibration of the piezoelectric component 244 to the driving unit 34 based on the type signal.

In a preferred embodiment, the AI parallel processing element 50 is an AI image recognition device electrically connected to the optical sensor 210 acting as the detecting unit 40 as well as the micro control unit 32. The optical sensor 210 provides a sensed image thereof to the AI image recognition device. Then, the AI image recognition device identifies the type of the foreign substances on the transparent cover 240 based on the image, and sends a type signal related to the type of the foreign substances to the micro control unit 32. Next, the micro control unit 32 receives the type signal from the AI image recognition device, and controls the frequency control unit 30 to send a command for driving the vibration of the piezoelectric component 244 to the driving unit 34 based on the type signal.

Referring to FIGS. 3 to 5A, the optical sensing device 20 may further include a circuit board 220 electrically connected to the optical sensor 210. More specifically, the circuit board 220 may comprise a camera board, a power board and a driver board for the piezoelectric component. For example, the various units of the optical detection system 10 as described above, such as the frequency control unit 30, the micro control unit 32, the driving unit 34, the AI parallel processing element 50, may be integrated on the circuit board 220.

Figure 8:
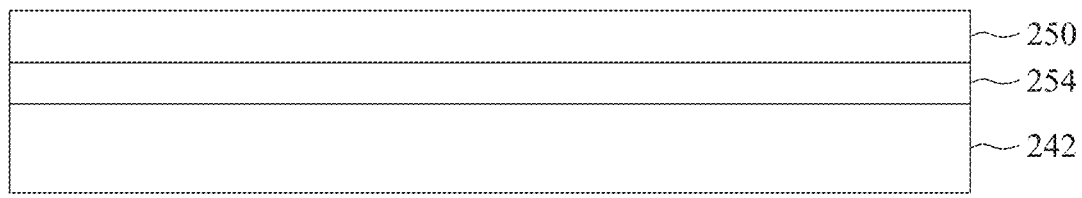
FIG. 8 illustrates an exemplary transparent cover according to the present invention.

Referring to FIG. 8, the transparent cover 240 includes a transparent substrate 242. The transparent substrate 242 may be formed of glass or plastic. At the outer side with respect to the internal space of the optical sensing device 20, the transparent cover 240 may further include a hydrophobic layer 250 or an anti-reflective layer 254 disposed on the transparent substrate 242 for reducing adhesion of water or increasing light transmittance. Preferably, the transparent cover 240 may include both the hydrophobic layer 250 and the anti-reflective layer 254, in this case, the anti-reflective layer 254 is disposed on the transparent substrate 242, and the hydrophobic layer 250 is disposed on the anti-reflective layer 254.

Referring to FIGS. 6A and 6B, the piezoelectric component 244 may comprise a piezoelectric material 246 and one or more electrode(s) 248 disposed on the piezoelectric material 246 in a non-evenly distributed manner. As shown in FIG. 6A, in one embodiment, the piezoelectric component 244 comprises a piezoelectric material 246 arranged as a layer having an annular shape and one electrode 248 disposed on the piezoelectric material 246, wherein the electrode 248 is disposed on only a portion of the piezoelectric material 246. As shown in FIG. 6B, in another embodiment, the piezoelectric component 244 comprises a piezoelectric material 246 and two electrodes 248, wherein each electrode 248 is disposed on only a portion of the piezoelectric material 246, and lines respectively connecting the center of the piezoelectric component 244 to the two electrodes 248 form an angle of about 90°.

Figure 9:
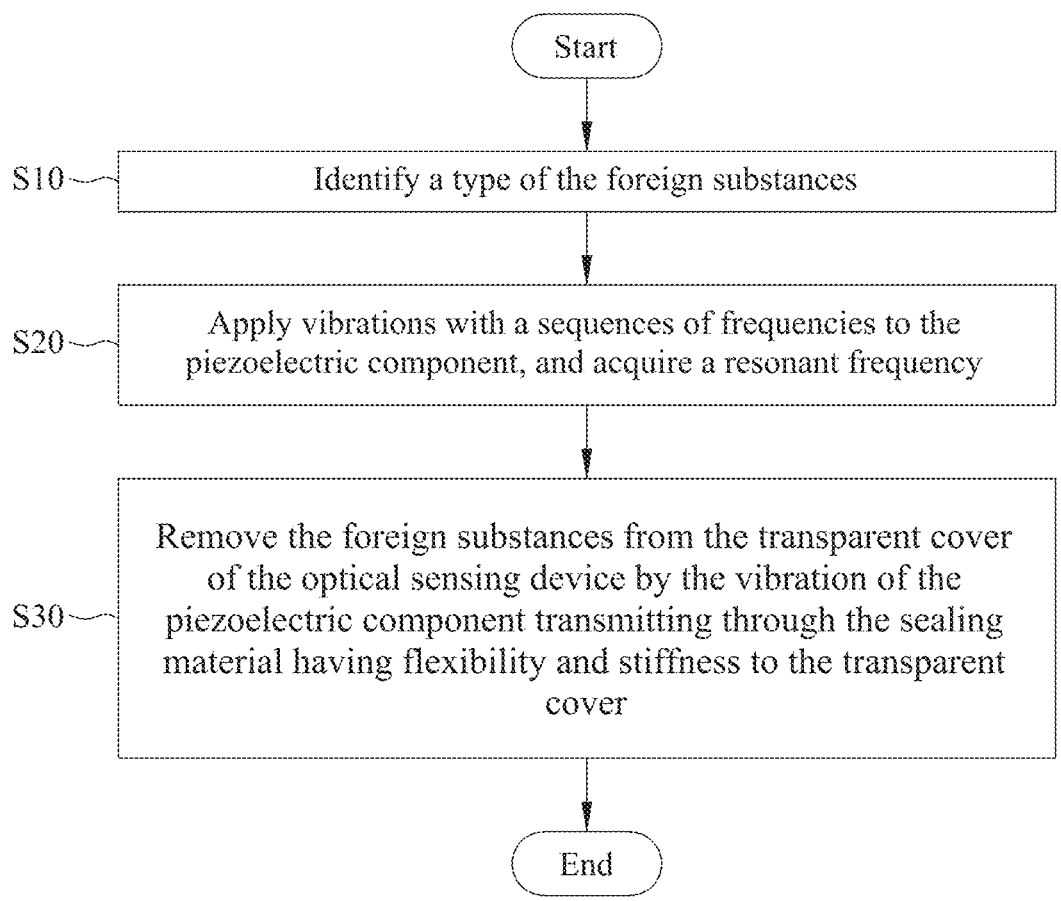
FIG. 9 is an exemplary flow diagram of the method according to the present invention.

Referring to FIG. 9, in another aspect of the present invention, a method for removing foreign substances on the optical detection system using the optical detection system 10 as described above is provided. The method according to the present invention comprises a removing step S30. In the removing step S30, a piezoelectric component 244 performs vibration, and the vibration is transmitted to a transparent cover 240 of an optical sensing device 20 through a sealing material 241 having flexibility and stiffness to remove foreign substances from the transparent cover 240.

In a preferred embodiment, the method according to the present invention may further comprise an identifying step S10 and a frequency acquiring step S20 before the removing step S30.

In the identifying step S10, a type of the foreign substances on the transparent cover 240 is identified based on at least one of a temperature of the transparent cover 240, an image detected by the optical detection system 10, and an impedance-vibration frequency curve of the piezoelectric component 244. For example, the foreign substances may be identified as fog, water, snow, frost, or ice based on the above-mentioned temperature, image, or impedance-vibration frequency curve; alternatively, the foreign substances may be identified as fog, water, snow, frost, ice or dirt based on the above-mentioned image or impedance-vibration frequency curve, wherein the dirt may be muddy water.

Specifically, in the case of identifying the foreign substances on the transparent cover 240 based on temperature, since fog, water, snow, frost, or ice have different temperatures, respectively, the temperature of the transparent cover 240 can be detected by a temperature detector, so as to identify the type of the foreign substances corresponding to the temperature.

Specifically, in the case of identifying the foreign substances on the transparent cover 240 based on image, for example, the image can be sensed by the optical sensor 210 of the optical detection system 10. Then, the image may be transmitted to a communication module through internet, Wi-Fi, ethernet, etc., and further uploaded to the clouds. Further, the type of the foreign substances on the transparent cover 240 can be identified by analyzing the detected image of the optical detection system 10 with an AI image recognition method utilizing analyzing algorithm using machine learning, deep learning, or neural network. For example, in one embodiment, the communication module transmits a command to a micro control unit (MCU) 32, and the micro control unit 32 controls the frequency control unit 30 and the driving unit 34 to perform the following frequency acquiring step S20.

Specifically, in the case of identifying the foreign substances on the transparent cover 240 based on impedance-vibration frequency curve, the impedance-vibration frequency curve of the piezoelectric component 244 may be obtained through an impedance analyzer, so as to identify the type of the foreign substances corresponding to said curve, The foreign substances being ice, snow, a mixture of snow and water, water, or muddy water may be identified based on the impedance-vibration frequency curve of the piezoelectric component. This is because the impedance-vibration frequency curve of a piezoelectric typically changes as the type of the foreign substances adhered to the piezoelectric component changes.

It can be understood that, in some embodiments, the identifying step S10 may be started based on another external signal. In one embodiment, the identifying step S10 may be started based on an input from a user. In another embodiment, the optical detection system 10 is used on an vehicle, and the identifying step S10 is started based on an operation signal of the wiper. The operation signal of the wiper may be transmitted to a micro control unit 32. A further identification for the transparent cover 240 of the optical sensing device 20 using a deep learning algorithm may be processed. For example, the identification may be an image analysis as described above and processed by an AI parallel processing element 50 (such as an AI image recognition device).

Figure 10:
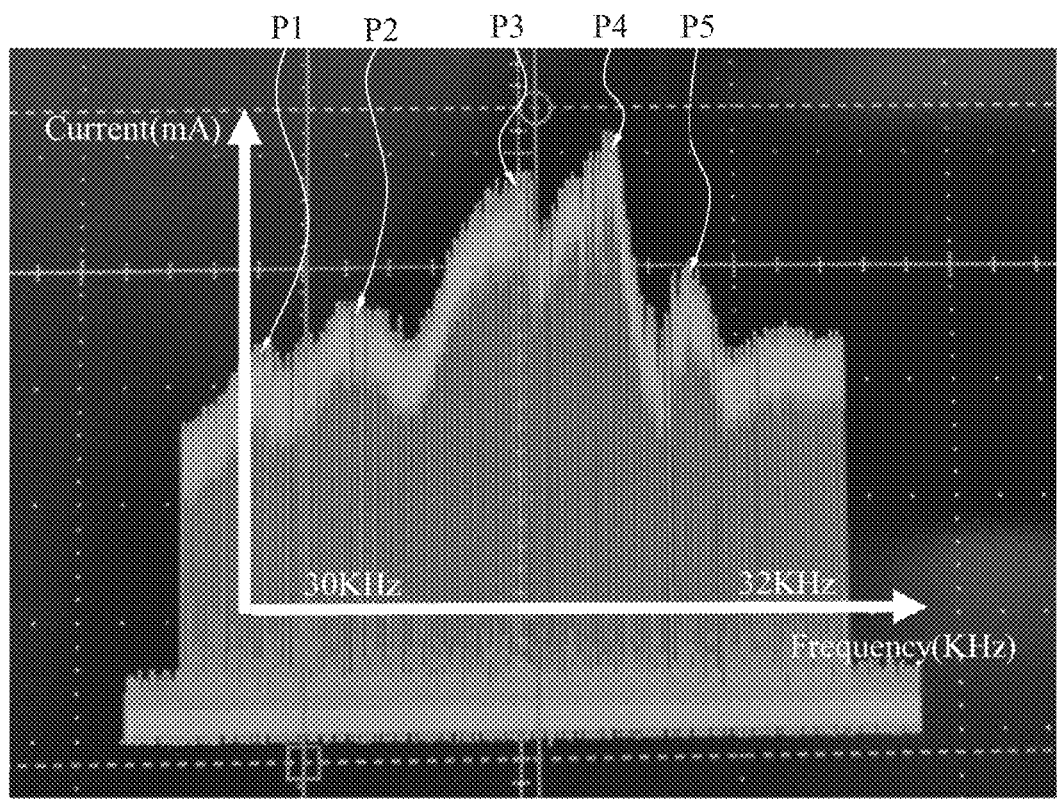
FIG. 10 is a current-frequency diagram of a piezoelectric component showing resonance of the piezoelectric component.

In the frequency acquiring step S20, vibrations of a sequence of frequencies are applied to the piezoelectric component 244, and one or more resonant frequencies of the piezoelectric component 244 are acquired. When the scan range for the frequency is expanded, one or more resonant frequencies may be acquired. Specifically, a corresponding voltage or current (that is, the current of the power unit 38) may be measured for each frequency, and the measured results may be mapped on a current-frequency diagram of a piezoelectric component (for example, FIG. 10), thereby a resonant point can be found from such diagram. For example, in FIG. 10, there are five points P1 (30.3 kHz, 160 mA), P2 (30.5 kHz, 170 mA), P3 (31 kHz, 230 mA), P4 (31.3 kHz, 260 mA), and P5 (31.5 kHz, 180 mA) corresponding to relative high currents, wherein the point P4 corresponding to the highest output current is the resonant point. The resonant frequency corresponding to the highest output current of the sequence of frequencies (such as the resonant frequency corresponding to the point P4) can be used in the following removing step S30 for driving the vibration of the piezoelectric component 244.

In some embodiments, since the resonant frequency of the piezoelectric component 244 changes as the condition that foreign substances adhere to the transparent cover changes, for every time it is desired to drive the vibration of the piezoelectric component 244 to remove the foreign substances, the resonant frequency of the piezoelectric component 244 may be scanned again, thereby removing the foreign substances with a most suitable vibration frequency. In some other embodiments, several times of the removing steps S30 may be carried on with only one time of the frequency acquiring step S20, particularly when the several times of the removing steps S30 are carried on in a short interval.

In the removing step S30, the foreign substances are removed from the transparent cover 240. The removing step S30 includes: determining at least one vibration frequency of the piezoelectric component 244 based on the one or more resonant frequencies and a vibration time according to the identified type of the foreign substances, and driving the vibration of the piezoelectric component 244 with the vibration frequency and the vibration time, thereby removing at least a portion of the foreign substances from the transparent cover 240 by the vibration of the piezoelectric component 244.

Preferably, in the removing step S30, the vibration frequency for driving the vibration of the piezoelectric component is in a range of 20 kHz to 1.4 MHz.

In the removing step S30, the vibration of the piezoelectric component 244 may be driven by pulse driving or continuous driving.

However, in drive circuit of the prior art (for example, US 20200358938 A1), the strategy for driving the vibration of the piezoelectric component is: firstly scanning the resonance frequency; and after the resonance frequency is determined, using the resonance frequency to drive the piezoelectric component to perform a continuous vibration. Such strategy is disadvantageous in that the circuit is prone to cause heat generation, and the energy efficiency is low.

Figure 11:
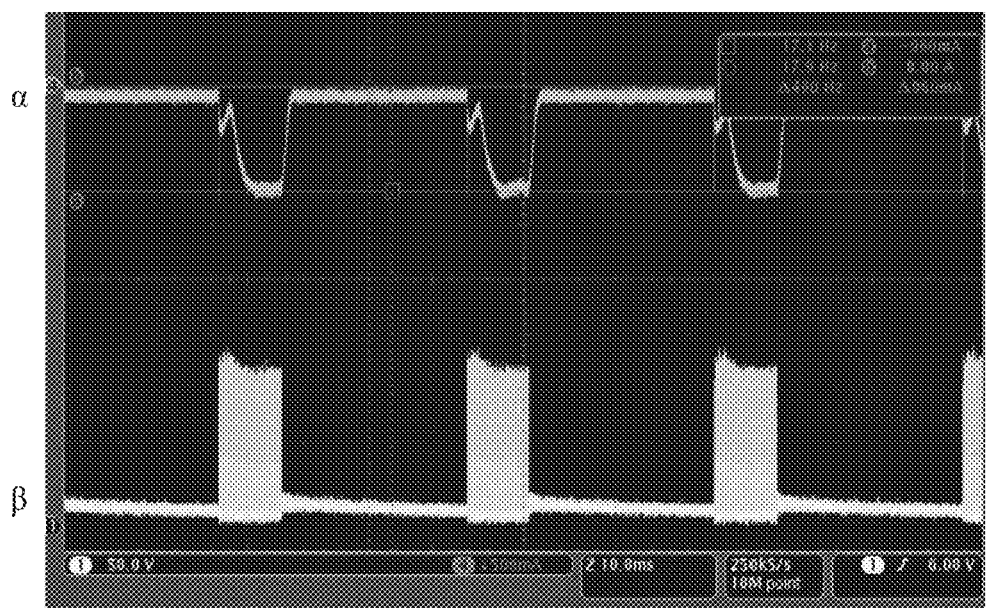
FIG. 11 is a graph showing the relationship of current and voltage versus time during a pulse driving of the method according to the present invention.

Therefore, in a preferred embodiment, instead of continuous driving, the vibration of the piezoelectric component 244 can be driven by pulse driving, as shown in FIG. 11. FIG. 11 is a graph showing the relationship of current and voltage versus time during a pulse driving of the method according to the present invention. In FIG. 11, the curve a is a curve of driving current versus time, and the curve β is a curve of driving voltage versus time, wherein the current is indicated in mA, the voltage is indicated in V, and the time is indicated in ms.

In the preferred embodiment of the present invention, the advantage of using pulse driving is that, in addition the power consumption can be reduced, the heat generation of the circuit due to continuous driving can also be avoided. Further, in the present invention, since the sealing material has ductility, the maximum force can be reached at the start of the vibration. Therefore, compared with the case of using continuous driving, in the case of using pulse driving, the vibration amplitude can be increased by about 30%.

In an embodiment, in the removing step S30, the vibration of the piezoelectric component 240 leads to at least one of shifting, bounce, temperature rising, atomization, melting, and sublimation of the foreign substances on the transparent cover 240. Typically, a high frequency can lead to the atomization, melting, heating, sublimation, or bounce of the foreign substances, and a low frequency can lead to the shifting of the foreign substances.

According to the identified type of the foreign substances, a resonant frequency that can lead to a suitable effect may be chosen as the vibration frequency, and thereby the foreign substances may be removed.

For example, when the foreign substances are identified as fog, a resonant frequency, which leads to temperature rising of fog, can be used as the vibration frequency to driving the piezoelectric component 244 to vibrate and then generate heat, thereby removing the fog.

For example, when the foreign substances are identified as water, a resonant frequency, which leads to atomization or shifting of water, can be used as the vibration frequency to driving the piezoelectric component 244 to vibrate, thereby causing the water to atomize or shift.

For example, when the foreign substances are identified as snow, frost, or ice, a resonant frequency, which leads to melting, shifting, or sublimating of snow, frost, or ice, can be used as the vibration frequency to driving the piezoelectric component 244 to vibrate, thereby causing the snow, frost, or ice to melt, shift, or sublimate; alternatively, a resonant frequency, which leads to atomization or shifting of water melted from snow, frost, or ice, can be further used as the vibration frequency to driving the piezoelectric component 244 to vibrate, thereby causing the water melted from snow, frost, or ice to atomize or shift.

For example, when the foreign substances are identified as muddy water, a resonant frequency, which leads to shifting of muddy water, can be used as the vibration frequency to driving the piezoelectric component 244 to vibrate, thereby causing the muddy water to shift.

In addition, in order to improve the efficiency of removing foreign substances, any combination of the above-mentioned resonance frequencies can be used at the same time, so as to simultaneously perform any combination of shifting, bounce, temperature rising, atomization, melting, and sublimation of the foreign substances.

For ease of operation, in some embodiments, a frequency interval, which includes one or more specific vibration frequencies corresponding to the resonance frequency of respective types of foreign substances, may be used directly to drive the vibration of the piezoelectric component 244. For a further understanding of the removing step S30, Embodiments E1 to E6 are provided in Table 1 hereinafter.

during the removal of the foreign substances, ice is melted by heat at first, the water drops melted from ice are then shifted and collected to form larger drops, finally the larger drops are atomized, thereby the ice is removed from the transparent cover 240.

It can be seen from Table 1 that in each of Embodiments E1 to E6, a regain good image clearance can be regained after the foreign substances are removed using the optical detection system or method according to the present invention. As such, the frequency interval from 28 kHz to 1.4 MHz may be applied to the removing step S30. For ease of device settings, in the removing step S30, a frequency interval from 20 kHz to 1.4 MHz may be applied for driving the vibration of the piezoelectric component.

In another embodiment, in the removing step S30, the transparent cover 240 may be further heated to remove foreign substances such as fog, water, snow, frost, or ice; alternatively, the transparent cover 240 may be washed by using a pressurized water jet to remove foreign substances such as fog, water, snow, frost, ice or muddy water.

Technical features used in the optical detection system according to the present invention can be applied to the method according to the present invention, and vice versa, as long as there is no contradiction arisen. Also, respective embodiments of the present invention may be combined with each other, as long as there is no contradiction arisen.

TABLE 1

|    | Foreign Substances | Vibration Frequency | MTF | Mechanism |
| --- | --- | --- | --- | --- |
| E1 | None/Fog | 1.25 MHz~1.4 MHz | 0.491 | Defogging by Heating |
| E2 | Ice | 28 kHz~1.4 MHz | 0.483 | (1) Melting of ice |
|    |          |                  |       | (2) Shifting and Collection of Water Drops |
|    |          |                  |       | (3) Atomization of Water Drops |
| E3 | Snow | 28 kHz~1.4 MHz | 0.487 | (1) Melting of Snow |
|    |          |                  |       | (2) Shifting and Collection of Water Drops |
|    |          |                  |       | (3) Atomization of Water Drops |
| E4 | Snow Water | 28 kHz~1.4 MHz | 0.492 | (1) Melting of Snow |
|    |          |                  |       | (2) Shifting and Collection of Water Drops |
|    |          |                  |       | (3) Atomization of Water Drops |
| E5 | Water | 28 kHz~45 kHz | 0.49 | (1) Shifting and Collection of Water Drops |
|    |          |                  |       | (2) Atomization of Water Drops |
| E6 | Muddy Water | 28 kHz~45 kHz | 0.479 | (1) Shifting and Collection of Water Drops |
|    |          |                  |       | (2) Atomization of Water Drops |

In Embodiments E1 to E6, in the optical detection system 10, a PZT (lead zirconium titanate) component is used as the piezoelectric component 244. For each of Embodiments E1-E6, the type of the foreign substances is identified by the identifying step S10 as described above. Next, the PZT component is driven to vibrate with a frequency interval corresponding to the type of the foreign substances. After the vibration, the clearance of the transparent cover 240 is evaluated in terms of image clearance (MTF). The above-mentioned types of foreign substances and their corresponding frequency intervals, removal mechanisms for foreign substance, and the evaluated image clearance of Examples E1 to E6 are recorded in Table 1.

In each of Embodiments E2 to E5, a combined vibration mode is employed for the PZT component. For example, in Embodiment E2, due to the different vibration frequencies Hereinafter, the technical effects of the present invention are verified by Comparative Examples and Experimental Examples.

Figure 1A:
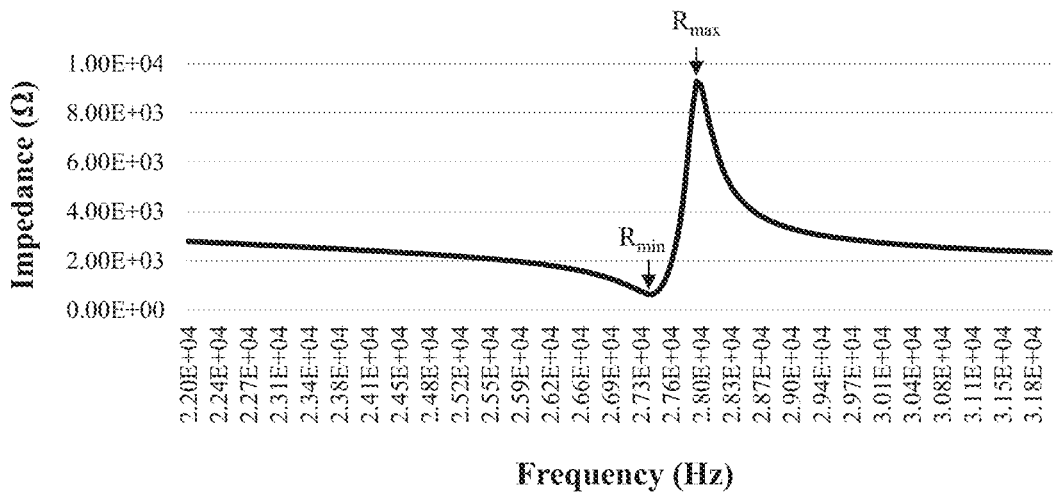
FIGS. 1A to 1C illustrate impedance-vibration frequency curves of piezoelectric components of existing optical detection systems.
Figure 1B:
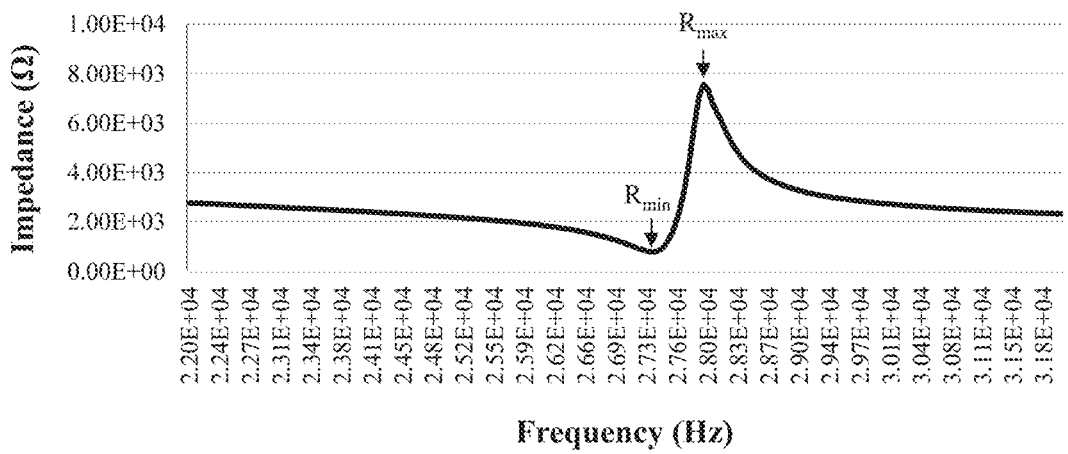
Figure 1C:
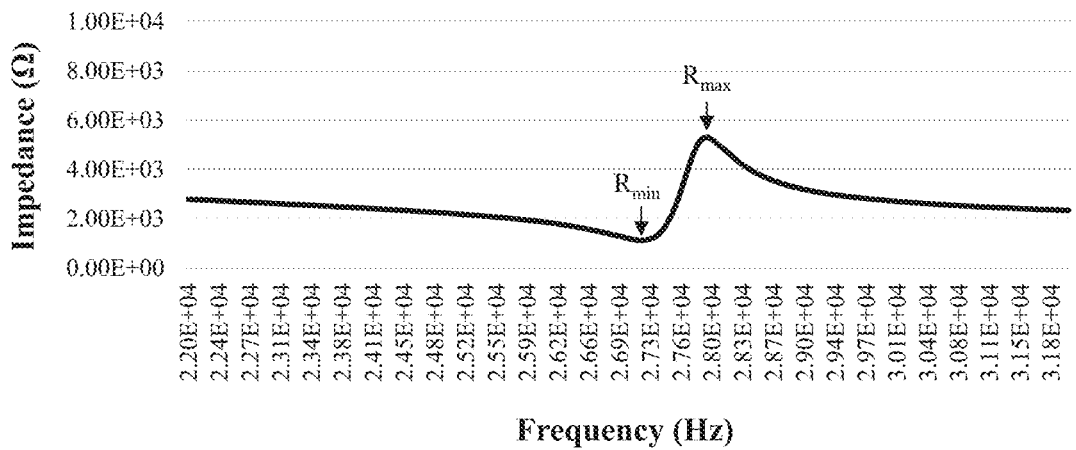

First, for optical detection system using a soft sealing material (O-ring) in the prior art (US 20200358938 A1) (Comparative Example 1) and the optical detection system of the present invention (Experimental Example 1), vibrations of a sequence of frequencies are applied to the piezoelectric components, and the impedances of the piezoelectric components are measured by an impedance analyzer, thereby obtaining impedance-vibration frequency curves similar to FIGS. 1A to 1C. Then, the structural performance parameters of Comparative Example 1 and Experimental Example 1 are obtained from respective curves, which are listed in Table 2 below.

TABLE 2

| Parameter | Before vibration | | | | After vibration | | | |
| --- | --- | --- | --- | --- | --- | --- | --- | --- |
| | F3 (kHz) | $R_{min}$ (kΩ) | $R_{max}$ (kΩ) | $R_{max}/R_{min}$ | F3 (kHz) | $R_{min}$ (kΩ) | $R_{max}$ (kΩ) | $R_{max}/R_{min}$ |
| Comparative Example 1 | 30.9 | 1.38 | 4.05 | 2.93 | 31.14 | 1.93 | 2.83 | 1.47 |
| Experimental Example 1 | 28.3 | 0.665 | 11.7 | 17.59 | 28.32 | 0.67 | 11.75 | 17.62 |

In Table 2, "before vibration" indicates a new optical detection system that has not undergone continuous operation, and "after vibration" indicates an optical detection system that has undergone continuous operation (vibration with a frequency of 30.9 kHz) for 8 hours, wherein F3 is the frequency corresponding to the anti-resonance point, $R_{min}$ is the minimum impedance corresponding to the anti-resonance point, and $R_{max}$ is the maximum impedance value corresponding to the resonance point. As described above, for piezoelectric materials, when $R_{max}$ is larger, $R_{min}$ is smaller, and the vibration amplitude is larger. When $R_{max}/R_{min}$ is larger, the vibration amplitude is larger.

It can be seen from Table 2 that the $R_{min}$ of Experimental Example 1 is significantly smaller than that of Comparative Example 1 regardless of before and after vibration, which indicates that the vibration amplitude of Experimental Example 1 is significantly larger than that of Comparative Example 1. That is, compared with the optical detection system using a soft sealing material in the prior art, the optical detection system using the sealing material in the present invention has significantly superior vibration ability, and thus has significantly superior removing ability for foreign substances.

Further, after 8 hours of continuous operation, $R_{min}$ of Experimental Example 1 only increases by 0.75% (which indicates that $R_{min}$ is almost maintained at the same level), while $R_{min}$ of Comparative Example 1 increases by 40% (which indicates that $R_{min}$ significantly increases). This means that after the continuous operation, the vibration ability of Experimental Example 1 is maintained at a level comparable to the level before the continuous operation, while the vibration ability of Comparative Example 1 is significantly reduced. That is, compared with the optical detection system using a soft sealing material in the prior art, the optical detection system using the sealing material in the present invention has significantly superior stability of the sealing material, and thus has significantly superior service life.

In addition, the average water removal power consumption in Comparative Example 1 is 2.7 Watt, while the average water removal power consumption in Experimental Example 1 is 1.4 to 2 Watt, which indicates that the optical detection system using the sealing material of the present invention also has an advantage of reducing power consumption.

Hereinafter, the technical effects of further using the soft shielding material are verified for the optical detection system of the present invention that already includes the sealing material.

Figure 12:
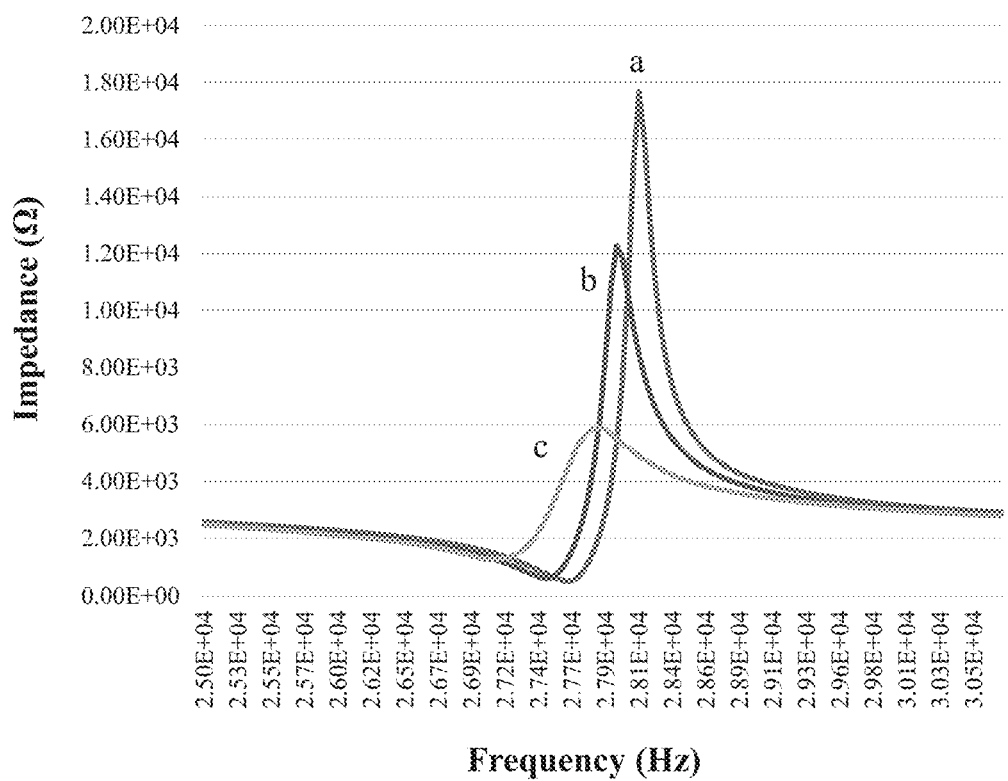
FIG. 12 illustrates impedance-vibration frequency curves of the piezoelectric component of the optical detection system according to the present invention before and after using a soft shielding material.

For the optical detection system including the sealing material of the present invention, in the cases with or without the use of a soft shielding material and/or with or without water-accumulation, vibrations of a sequence of frequencies are applied to the piezoelectric components, and the impedances of the piezoelectric components are measured by an impedance analyzer, thereby obtaining impedance-vibration frequency curves of FIG. 12. In FIG. 12, curve a represents the case without the use of soft shielding material and without water-accumulation in the gap; curve b represents the case with the use of soft shielding material; and curve c represents the case without the use of soft shielding material but with water-accumulation in the gap. In FIG. 12, the best vibration effect occurs when the impedance value of the piezoelectric component is between 27.6 and 27.7 kHz.

It can be seen from FIG. 12, for $R_{max}$ (resistance value corresponding to the highest point of the curve), curve a (no soft shielding material, no water-accumulation)>curve b (using soft shielding material)>curve c (no soft shielding material, but with water accumulation). For piezoelectric materials, when $R_{max}$ is larger, $R_{min}$ is smaller, and the vibration amplitude is larger, therefore, for the vibration amplitude, the trend is the same (curve a>curve b>curve c).

In the case with the use of soft shielding material (curve b), although $R_{max}$ is slightly lower than that in the case without the use of soft shielding material and without water-accumulation (curve a), $R_{max}$ of curve b can still be maintained above 12 kΩ, which is 2 times of that in the case with water-accumulation (curve c) (larger value of $R_{max}$ represents better vibration ability).

Therefore, in addition to the advantage of using the sealing material, the additional advantage of further using a soft shielding material to shield the gap is that, it is possible to prevent water or other substances from adhering to the exposed sealing material, therefore, the good vibration ability achieved by using the sealing material can be maintained.

Hereinafter, the technical effects of further using pulse driving to drive the vibration of the piezoelectric component is verified for the optical detection system of the present invention that already includes the sealing material.

Table 3 shows the comparison results of the power consumption of the optical detection system of the present invention under working modes of continuous driving and pulse (intermittent) driving.

TABLE 3

| Working mode | Current (mA) | Input voltage (V) | Duty Cycle | Power consumption (Watt) |
| --- | --- | --- | --- | --- |
| Continuous driving | 560 | 12 | 100% | 6.7 |
| Pulse driving | 560 | 12 | 55% | 3.7 |

It can be seen from Table 3 that under the same current and input voltage, compared with the continuous driving, there is only 55% of the power consumption required for the pulse driving to achieve the same effect.

The optical detection system according to the present invention can be used as an electric side mirror or other applications on vehicles, or other applications other than those on vehicles, such as surveillance cameras or the like.

The optical detection system and method according to the present invention can be used to remove the foreign substances from the optical detection system rapidly and instantly, for example, the substances such as ice, snow or frost can be removed in few minutes, or even the substances such as water can be removed in one second. Therefore, clear images can be sustained, and the optical detection system can be used with a good image quality even when muddy water is sprayed onto the optical detection system or the car is driven in a bad weather, such as rain, snow, fog, or the like. When the optical detection system is used on vehicles, this is particularly beneficial for driving safety In particular, in the optical detection system and method according to the present invention, a sealing material is used as the interface between the vibration source and the surroundings, since the sealing material has good ductility, tensile strength, elongation, flexibility and stiffness, and water resistance, in addition that an excellent removing ability for foreign substances can be achieved by the effective transmission of vibration, the effects of reducing load and power consumption, prolonging service life, and preventing leakage of moisture or water can also be achieved. Further, by selecting a suitable sealing material according to the actual use, the effects of effective heat dissipation and reducing resonance frequency can be achieved, or the effect of effectively gathering heat and removing foreign substances can be achieved.

In addition, in the optical detection system and method according to the present invention, in the embodiments in which a soft shielding material is further used to prevent water or other substances from adhering to the exposed sealing material, it is possible to preferably maintain the good vibration ability achieved by the sealing material.

In addition, in the method according to the present invention, in the case of further using pulse driving instead of continuous driving to drive the vibration of the piezoelectric component, an additional effect of further reducing power consumption can be achieved.

It will be apparent to those skilled in the art that various modifications and variations can be made to the disclosed embodiments. It is intended that the specification and examples be considered as exemplary only, with a true scope of the disclosure being indicated by the following claims and their equivalents.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An optical detection system capable of automatically removing foreign substances comprising an optical sensing device, the optical sensing device includes:
    a housing having an opening on one side thereof;
    a transparent cover disposed at the opening, the housing and the transparent cover jointly define an internal space of the optical sensing device;
    an optical sensor provided in the internal space of the optical sensing device;
    a lens module provided between the transparent cover and the optical sensor;
    a piezoelectric component, wherein in the internal space of the optical sensing device, the piezoelectric component is provided at an edge of the transparent cover; and
    a sealing material having flexibility and stiffness, which has an annular flake shape, is provided between the edge of the transparent cover and an edge of the piezoelectric component, and extended and fixed to the housing to seal the internal space of the optical sensing device; wherein
    the piezoelectric component performs vibration, and the vibration is transmitted to the transparent cover through the sealing material to remove foreign substances from the transparent cover.

2. The optical detection system according to claim 1, wherein
    the optical sensing device further includes a soft shielding material, which has an annular flake shape and is disposed on an outer side of the housing and the transparent cover to shield a gap among the housing, the transparent cover and the sealing material.

3. The optical detection system according to claim 1, wherein the lens module is arranged at the opening, and the lens module includes:
    a top lens, which is the transparent cover of the optical sensing device, and is disposed at an outermost side of the lens module with respect to the internal space of the optical sensing device;
    a lateral casing, wherein the housing of the optical sensing device further includes the lateral casing, and the top lens and the housing of the optical sensing device including the lateral casing jointly define the internal space of the optical sensing device;
    a bottom lens disposed on an opposite side of the top lens, and the top lens, the lateral casing and the bottom lens jointly define an interior space of the lens module; and
    one or more interior lens(es), wherein in the interior space of the lens module, the interior lens(es) is(are) disposed between the top lens and the bottom lens; wherein
    in the interior space of the lens module, the piezoelectric component is provided at an edge of the top lens;
    the sealing material is provided between the edge of the top lens and the edge of the piezoelectric component, and extended and fixed to the lateral casing to seal the internal space of the optical sensing device; and wherein
    the piezoelectric component performs the vibration, and the vibration is transmitted to the top lens through the sealing material to remove foreign substances from the top lens.

4. The optical detection system according to claim 1, wherein the sealing material includes one or more selected from a group consisting of aluminum, steel, titanium alloy, magnesium aluminum alloy, polyimide, polycarbonate, and polyethylene terephthalate.

5. The optical detection system according to claim 1, wherein the sealing material has a thickness of 10 to 200 μm.

6. The optical detection system according to claim 2, wherein the soft shielding material has a thickness of 10 to 500 μm.

7. The optical detection system according to claim 2, wherein the soft shielding material includes one or more selected from a group consisting of polyurethane, ethylene propylene diene monomer, silicone and polyimide.

8. The optical detection system according to claim 1, further comprising:
    a frequency control unit electrically connected to the optical sensing device; wherein
    the frequency control unit controls a frequency and a vibration time for driving the vibration of the piezoelectric component such that the piezoelectric component vibrates with at least one vibration frequency based on one or more resonant frequencies of the piezoelectric component and the vibration time to remove foreign substances from the transparent cover.

9. The optical detection system according to claim 8, further comprising:
one or more detecting unit(s);
a micro control unit electrically connected to the frequency control unit and the detecting unit(s); and
a driving unit electrically connected to the frequency control unit and the piezoelectric component; wherein
the detecting unit(s) detect(s) a state of the optical sensing device, and sends a state signal related to the state of the optical sensing device to the micro control unit,
the micro control unit receives the state signal from the detecting unit(s), and controls the frequency control unit to send a command for driving the vibration of the piezoelectric component to the driving unit based on the state signal, and
the driving unit drives the vibration of the piezoelectric component in response to the command from the frequency control unit.

10. The optical detection system according to claim 9, wherein the state of the optical sensing device includes a least one of an image on the transparent cover, an impedance-vibration frequency curve of piezoelectric components, and a temperature of the transparent cover.

11. The optical detection system according to claim 9, further comprising: an AI image recognition device electrically connected to the optical sensor and the micro control unit; wherein
the optical sensor provides a sensed image thereof to the AI image recognition device,
the AI image recognition device identifies a type of the foreign substances on the transparent cover based on the image, and sends a type signal related to the type of the foreign substances to the micro control unit, and
the micro control unit receives the type signal from the AI image recognition device, and controls the frequency control unit to send the command for driving the vibration of the piezoelectric component to the driving unit based on the type signal.

12. A method for automatically removing foreign substances on an optical detection system using the optical detection system according to claim 1, comprising:
a removing step removing the foreign substances from a transparent cover of an optical sensing device by a vibration of a piezoelectric component transmitting through a sealing material having flexibility and stiffness to the transparent cover.

13. The method according to claim 12, further comprising the following steps before the removing step:
an identifying step identifying a type of the foreign substances on the transparent cover based on at least one of a temperature of the transparent cover, an image detected by the optical detection system, and an impedance-vibration frequency curve of the piezoelectric component; and
a frequency acquiring step applying vibrations of a sequence of frequencies to the piezoelectric component and acquiring one or more resonant frequencies of the piezoelectric component; and
wherein the removing step further includes: determining at least one vibration frequency of the piezoelectric component based on the one or more resonant frequencies and a vibration time according to the identified type of the foreign substances, and driving the vibration of the piezoelectric component with the vibration frequency and the vibration time, thereby removing at least a portion of the foreign substances from the transparent cover by the vibration of the piezoelectric component.

14. The method according to claim 12, wherein in the removing step, the vibration of the piezoelectric component is driven by pulse driving or continuous driving.

15. The method according to claim 12, wherein in the removing step, the vibration frequency for driving the vibration of the piezoelectric component is in a range of 20 kHz to 1.4 MHz.

16. The method according to claim 13, wherein in the identifying step, the type of the foreign substances on the transparent cover is identified by analyzing the detected image of the optical detection system with an AI image recognition method.

17. The method according to claim 16, wherein the AI image recognition method is an analyzing algorithm using machine learning, deep learning, or neural network.

18. The method according to claim 13, wherein in the identifying step, the foreign substances being fog, water, snow, frost, ice, or muddy water are identified based on at least one of a temperature of the transparent cover, an image detected by the optical detection system, and an impedance-vibration frequency curve of the piezoelectric component.

19. The method according to claim 12, wherein in the removing step, the vibration of the piezoelectric component leads to at least one of shifting, bounce, temperature rising, atomization, melting, and sublimation of the foreign substances on the transparent cover.

20. The method according to claim 12, wherein the removing step further includes at least one of the following steps:
heating the transparent cover; and
washing the transparent cover using a water jet.

* * * * *